(12) United States Patent
Sampson

(10) Patent No.: US 6,672,432 B2
(45) Date of Patent: Jan. 6, 2004

(54) TWO PIECE STAMPED BRAKE SHOE

(75) Inventor: Ernest Sampson, Shelby Township, MI (US)

(73) Assignee: Meritor Heavy Vehicle Technology, LLC, Troy, MI (US)

(*) Notice: Subject to any disclaimer, the term of this patent is extended or adjusted under 35 U.S.C. 154(b) by 0 days.

(21) Appl. No.: 10/153,136

(22) Filed: May 21, 2002

(65) Prior Publication Data

US 2003/0217900 A1 Nov. 27, 2003

(51) Int. Cl.$^7$ .............................................. F16D 69/00
(52) U.S. Cl. .............. 188/250 G; 188/252; 188/250 C; 188/250 D; 188/250 B
(58) Field of Search ............................ 188/250 R, 252, 188/250 A, 250 C, 250 D, 250 F, 250 G, 250 B

(56) References Cited

U.S. PATENT DOCUMENTS

| | | | | |
|---|---|---|---|---|
| 1,609,557 A | * | 12/1926 | La Brie | 188/250 F |
| 1,614,460 A | * | 1/1927 | Dodge | 188/250 F |
| 1,616,583 A | * | 2/1927 | La Brie | 188/250 C |
| 1,622,133 A | * | 3/1927 | Dodge | 188/250 C |
| 1,630,060 A | * | 5/1927 | McConkey | 188/324 |
| 1,636,003 A | * | 7/1927 | La Brie | 188/250 C |
| 1,671,759 A | * | 5/1928 | Bendix | 188/234 |
| 1,680,911 A | * | 8/1928 | Loughead | 188/250 C |
| 1,759,585 A | | 5/1930 | McIntyre | |
| 1,771,594 A | | 7/1930 | Thompson | |
| 1,810,923 A | | 6/1931 | Mooers | |
| 1,915,857 A | * | 6/1933 | Loughead | 188/327 |
| 1,977,916 A | * | 10/1934 | Nelson | 188/331 |
| 2,048,921 A | | 7/1936 | Cox | |
| 2,568,777 A | | 9/1951 | Super | |
| 2,658,473 A | * | 11/1953 | Hunt | 188/250 C |
| 4,360,959 A | | 11/1982 | Johannesen | |
| 4,546,862 A | * | 10/1985 | Shellhause | 188/331 |
| 4,573,249 A | * | 3/1986 | Shellhause | 29/432 |
| 4,771,870 A | | 9/1988 | Belk | |
| 5,839,550 A | | 11/1998 | Redgrave et al. | |

* cited by examiner

Primary Examiner—Christopher P. Schwartz
Assistant Examiner—Devon Kramer
(74) Attorney, Agent, or Firm—Carlson, Gaskey & Olds

(57) ABSTRACT

A brake shoe assembly includes the first and second sections defining a lining surface and a mounting tab. The mounting tab extends perpendicular from the lining surface and includes a series of notches allowing the formation of the lining surface into an arcuate shape. The mounting tabs are secured together such that subsequent manufacturing operations to correct distortion are not required. A brake lining is secured to the lining surface.

18 Claims, 2 Drawing Sheets

TWO PIECE STAMPED BRAKE SHOE

BACKGROUND OF THE INVENTION

This invention relates to a brake shoe assembly and method of fabricating a brake shoe assembly for an automotive brake.

Typically, a brake shoe is fabricated to include an arcuate surface corresponding to the inner diameter of a brake drum. A brake lining is adhered to the arcuate surface of the brake shoe. Extending substantially perpendicular from the brake shoe on a side opposite the brake lining is a web structure. The web structure is typically attached to the arcuate surface by a fillet weld. Welding of any type introduces a great deal of heat into the parts being welded. This typically will distort the brake shoe and require additional manufacturing processes.

One process for correcting distortion is a coining process. In a coining process a welded brake shoe is placed within a die structure and forced back into the desired arcuate shape. The cost of the assembly of a typical brake shoe encourages the recycling of the brake shoes when the lining has worn and requires replacement. Typically, worn brake shoes are returned to the manufacturer for resurfacing and relining. The cost of such relining and reconditioning of the brake shoe can be prohibitive because of the additional equipment required.

Accordingly, it is desirable to construct a low cost brake shoe assembly that is both reconditionable and provides a construction that makes a disposal brake shoe economically feasible.

SUMMARY OF THE INVENTION

An embodiment of this invention includes first and second brake shoe sections, each including a lining surface and a mounting tab with a series of notches accommodating formation of an arcuate lining surface to match a specific brake drum diameter.

Each of the brake shoe sections defines a lining surface and a mounting tab. The mounting tab extends substantially perpendicular to the lining surface and provides a mating point with the mounting tab of the other section of the brake shoe assembly. Each mounting tab includes a series of notches along the length of the mounting tab. The notches in the mounting tab allow formation of the lining surface into an arcuate shape corresponding to the brake drum assembly. The mounting tabs are secured to each other at several mounting points. Each mounting point includes an opening for a rivet or other fastening device. Note that using a rivet introduces no heat during fabrication of the brake assembly. Because no heat is introduced during fabrication of the brake shoe assembly, subsequent forming processes to ensure the proper arcuate shape of the lining surface become unnecessary.

Alternatively, the mounting tabs are secured to one another using a spot welding process. The spot welding process exerts a specific amount of heat in precise and discreet locations on the mounting tab such that excessive heat is not introduced to the brake shoe assembly. Therefore, a brake shoe assembly formed with a spot welding process does not require subsequent manufacturing processes to assure the proper arcuate shape of the brake shoe assembly.

In another embodiment of the brake shoe assembly, a joint member is positioned between the first and second sections of the brake shoe assembly. The joint member is a u-shaped member that provides for mounting of the brake shoe in brake assemblies requiring a specific configuration. The joint member comprises a portion of the lining surface to which the brake lining is secured.

The brake lining of this invention can be bonded through the use of an adhesive as known by those skilled in the art. Alternatively, the brake lining may be riveted to the lining surface of the brake shoe assembly.

This invention includes a method for fabricating a brake shoe and includes the steps of forming first and second brake shoe sections from sheet metal to define a mounting tab and a lining surface. The method further includes removing material from the mounting tabs to form a series of notches to allow for the formation of an arcuate surface. The mounting tabs are then secured to one another to form the brake shoe assembly. A brake lining is then attached to the lining surfaces by any means as known to a worker skilled in the art.

The brake shoe assembly of this invention provides simple cost-efficient brake shoes to reduce manufacturing costs and make a disposable brake shoe economically feasible.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
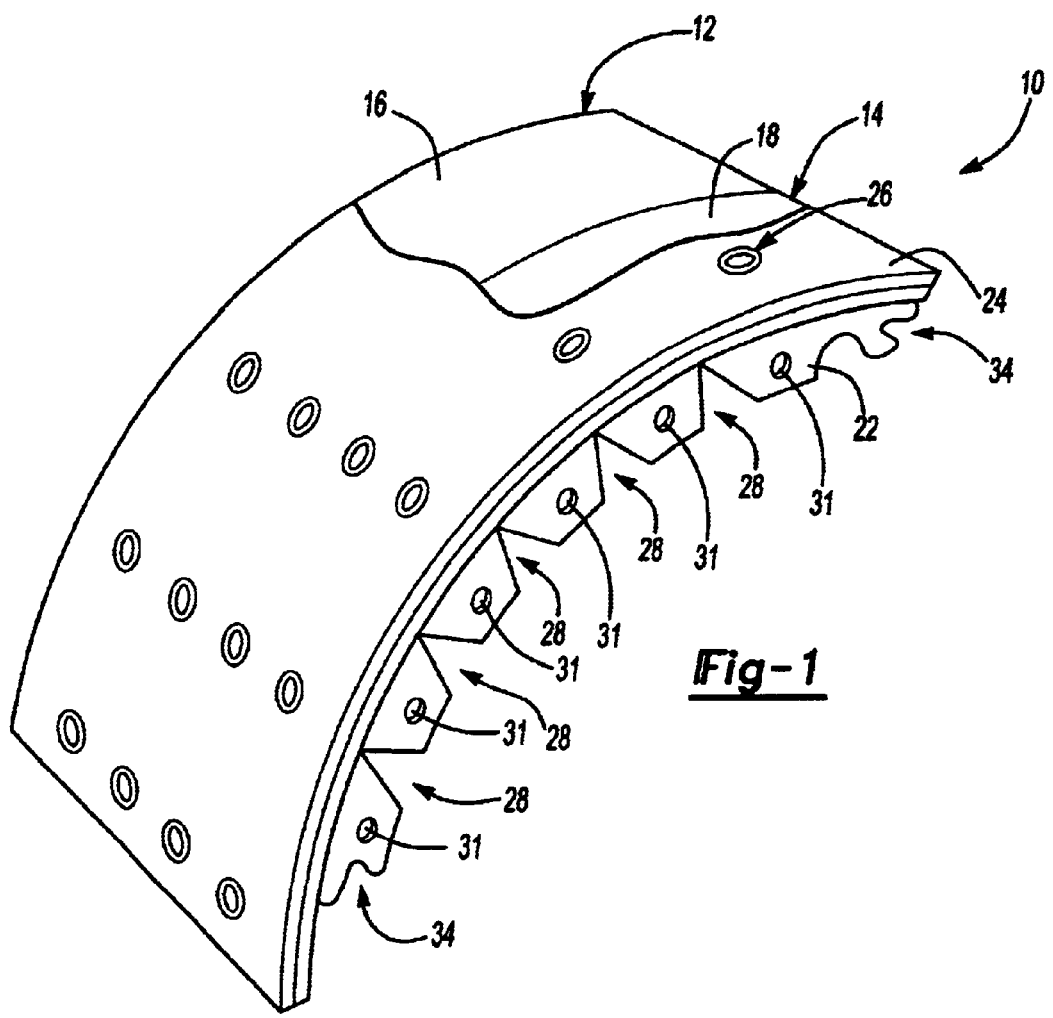
FIG. 1 is a perspective view of a brake shoe.
Figure 2:
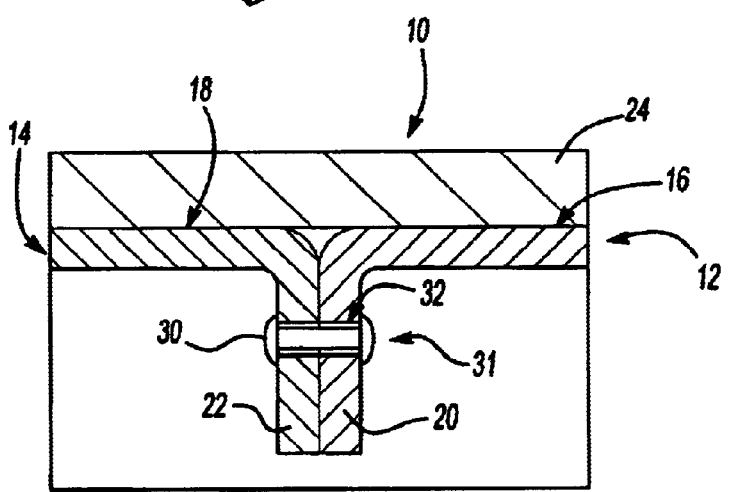
FIG. 2 is a cross-sectional view of the brake shoe.

Referring to FIGS. 1 and 2, a brake shoe assembly 10 includes a first section 12 and a second section 14. Each section 12, 14 defines a lining surface 16, 18 and a mounting tab 20, 22. The mounting tabs 20, 22 extends perpendicularly from the lining surface 16, 18. Each section 12,14 is preferably fabricated from a single sheet of material.

The lining surfaces 16, 18 form an arcuate shape corresponding to a brake drum assembly of a braking system. As is appreciated, the specific arcuate shape of the brake assembly is application specific and many configurations of the brake shoe assembly 10 are within the contemplation of this invention.

Each of the mounting tabs includes a series of notches 28. The notches 28 allow bending of the section 12, 14 into the arcuate shape. Preferably, the notches 28 are v-shaped providing sufficient flexibility of the first and second sections 12, 14 to form the desired shape of the brake shoe assembly 10. Although v-shaped notches are illustrated, any shape of notch allowing formation of an arcuate shape of the lining surface is within the contemplation of this invention. Because the mounting tabs 20, 22 are integral to the lining surface and do not require subsequent fastening steps, the arcuate shape of the brake shoe assembly 10 is maintained throughout the manufacturing process.

Attaching the first section 12 to the second section 14 at fastening points 31. Each fastening point 31 includes corresponding openings 32 defined in each of the mounting tabs 20, 22. Rivets 30 secure the mounting tabs 20, 22 together, securing the first and second sections 12, 14 to one another. The rivet 30 does not Goreq heat and therefore does not introduce distortion-causing heat to the brake shoe assembly 10. The absence of heat during assembly eliminates distortion, which in turn eliminates subsequent manufacturing operations to correct for distortion caused by heat.

The brake lining 24 is secured to the lining surfaces 16, 18. A series of rivets A 26 secure the brake lining 24 to the lining surfaces 16, 18 (FIG. 1). Alternatively, the brake lining 24 is bonded directly to the lining surfaces 18 and 16 such that the use of rivets is unnecessary. It should be understood that it is within the contemplation of this invention to secure the lining 24 to the lining surfaces 16 and 18 by any method known to a worker skilled in the art.

Figure 3:
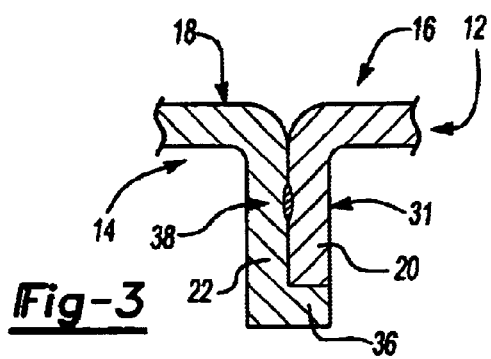
FIG. 3 is a partial cross-sectional view of an alternate embodiment of the brake shoe.

Referring to FIG. 3, another embodiment of this invention includes an alignment feature to properly align the first section 12 to the second section 14. The alignment feature includes a lip 36 disposed on one of the mounting tabs 20, 22. The lip 36 extends perpendicularly from the mounting tab 22. The mounting tab 20 corresponds to the lip 36 providing alignment of lining surfaces 16, 18.

Figure 4:
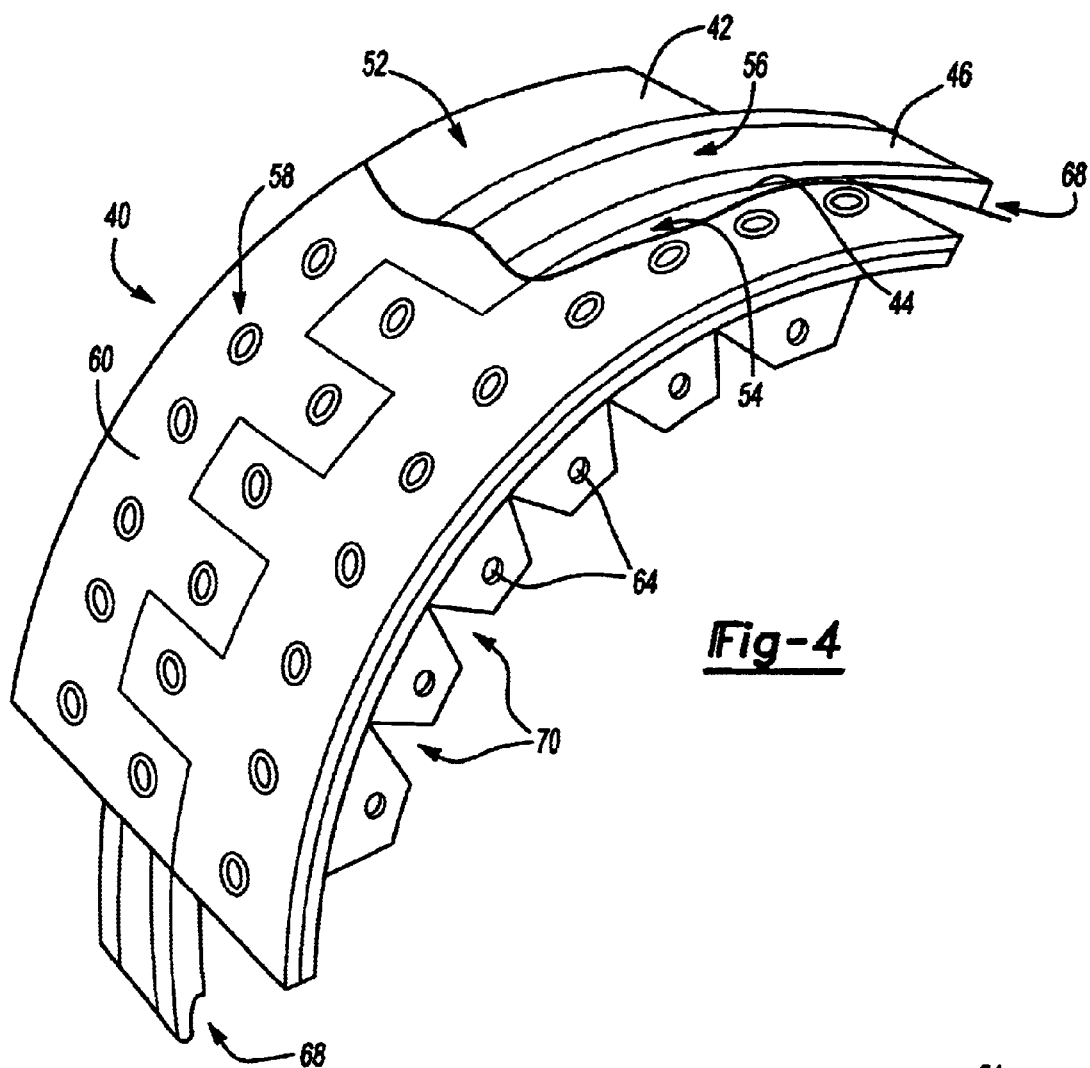
FIG. 4, is a perspective view of another embodiment of the brake shoe.
Figure 5:
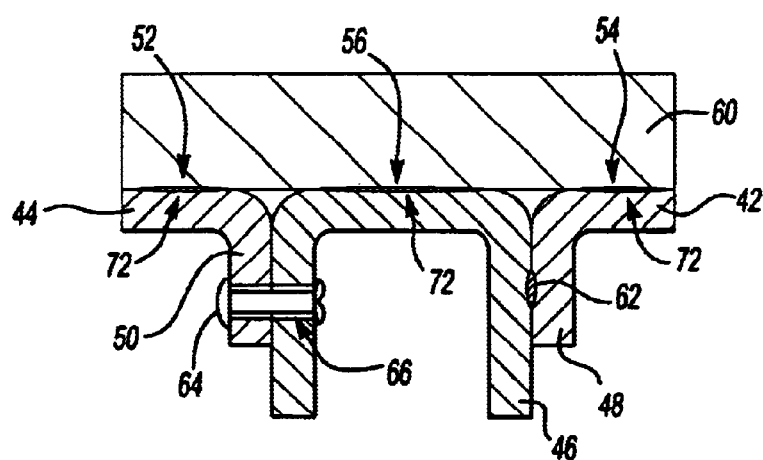
FIG. 5 is a cross-sectional view of the brake shoe shown in FIG. 4.

Referring to FIGS. 4 and 5, another embodiment of the brake shoe assembly is generally indicated at 40. This embodiment of the brake shoe assembly 40 includes a joint member 46. The joint member 46 is secured between each of the sections 44, 42. The joint member 46 provides for adaptation of a brake shoe assembly to brake systems that require a specific mounting configuration. The joint member 46 includes mounting notches 68 for mounting within the braking system. Note that the notches 68 are configured to fit the specific application of the brake shoe 40.

The brake shoe 40 includes the first section 42 and second section 44 that define first and second lining surfaces 52, 54 and a brake lining 60 adhered to the lining surfaces 52 and 54. The joint member 46 also includes a lining surface 56.

The joint member 46 along with the mounting tabs 50, 48 include a series of notches 70. Preferably, the notches 70 are v-shaped to allow for the shaping of the lining surfaces 52, 56 and 54 to correspond to the inner surface of a brake drum of the brake assembly.

FIG. 4 illustrates mounting of the lining 60 to the brake shoe assembly 40 to the use of a series of rivets 58. FIG. 5 illustrates the securing of the lining 60 to the brake shoe assembly 40 by an adhesive generally indicated at 72. It is understood that it is within the contemplation of this invention to secure the brake lining 60 to the brake shoe 40 by any means known to one skilled in the art.

Referring to FIGS. 1 and 2, the invention also includes a method of fabricating a brake shoe assembly 10. The method includes the steps of forming first and second brake shoe section 12,14 from a flat sheet of metal to define mounting tabs 20,22 and a lining surface 16,18. The mounting tabs 20,22 include a series of v-shaped notches 28. The v-shaped notches 28 facilitate the formation an arcuate surface of the brake shoe assembly 10 corresponding to the inner surface of a brake drum. The mounting tabs 20,22 are secured together at fastening points 31. Each of the fastening points 31 preferably defines an opening 32 through which rivet 30 extends to secure the sections 12,14 of the brake shoe assembly 10 to each other.

In an alternate embodiment of this invention, the fastening points 31 are specific discreet locations where a spot weld process forms a discreet weld. The spot weld process is such a magnitude to limit the introduction of heat to the brake shoe 10 such that substantially no distortion is introduced. An alternate embodiment of this invention includes forming a lip 36 into one of the mounting tabs 20, 22 and aligning the lining surfaces 16 and 18 with each other through the use of the lip 36.

The method further includes the step of securing the brake lining to the lining surfaces 16, 18 of the brake shoe assembly. Preferably, the brake lining is attached to the lining surfaces 16 and 18 by a series of rivets 26. Alternatively, the brake lining 24 is attached to the lining surface 16 and 18 by an adhesive to bond the lining 24 to the lining surfaces 16 and 18.

Referring to FIG. 4 and 5, an alternate embodiment of the method includes the step of forming joint member 46 from sheet metal. The joint member is preferably formed in a u-shape and includes a series of notches 70. The notches 70 of the joint member correspond to notches 70 of the mounting tabs. The joint member 46 is then secured to each of the mounting tabs 50,48 of each of the brake shoe section 42,44. The joint member 46 forms a central portion 56 of the lining surface. The joint member 46 provides for a specific configuration of mounting the brake shoe 40 within a brake assembly.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A brake shoe assembly comprising:
   first and second sections each defining a lining surface and a mounting tab, said mounting tabs extending substantially perpendicular to said lining surfaces;
   said lining surfaces forming an arcuate surface corresponding to an internal surface of a brake drum; and
   said first and second sections secured together at fastening points disposed on said mounting tabs; and
   a series of notches spaced along a radial inner surface of said mounting tabs for bending formation of said arcuate lining surface.

2. The assembly of claim 1, wherein said series of notches are v-shaped.

3. The assembly of claim 1, wherein said fastening points define corresponding openings in each mounting tab, and a fastener extends through each of said mounting tabs securing said first and second sections together.

4. The assembly of claim 1 wherein said fastening point defines a spot-weld to secure said first and second sections together.

5. The assembly of claim 1, wherein one of said mounting tabs includes a lip extending substantially perpendicular to said mounting tab and cooperating with the other of said mounting tabs to align said lining surfaces.

6. The assembly of claim 1, wherein said mounting tabs define mounting notches for mounting said brake shoe assembly within a brake assembly.

7. The assembly of claim 1, further including a joint member, said joint member fastened between said mounting tabs of said first and second sections.

8. The assembly of claim 7, wherein said joint member defines a u-shape.

9. The assembly of claim 8, wherein said joint member includes mounting tabs, and said mounting tabs including a series of notches allowing formation of said arcuate lining surface.

10. The assembly of claim 7, further including openings in said joint member corresponding with an opening defined in each of said mounting tabs, and a fastening member extending through said joint member and said mounting tab to secure said mounting tabs to said joint member.

11. The assembly of claim 7, further including a spot weld between said joint member and each of said mounting tabs to secure said mounting tabs to said joint member.

12. The assembly of claim 7, wherein said joint member defines a portion of said lining surface.

13. The assembly of claim 7, wherein said joint member includes brake shoe mounting notches for mounting of the brake shoe within a brake assembly.

14. The assembly of claim 1, further including a brake lining bonded to said lining surface.

15. The assembly of claim 1, further including a brake lining riveted to said lining surface.

16. The assembly as recited in claim 1, wherein said series of notches are uniformly shaped.

17. The assembly as recited in claim 1, wherein said series of notches are uniformly spaced along said radial inner end.

18. The assembly as recited in claim 1, wherein said mounting tabs comprise first and second distal ends and said series of notches are uniformly spaced between said first and second distal ends.

* * * * *

UNITED STATES PATENT AND TRADEMARK OFFICE
CERTIFICATE OF CORRECTION

PATENT NO. : 6,672,432 B2
DATED : January 6, 2004
INVENTOR(S) : Sampson

It is certified that error appears in the above-identified patent and that said Letters Patent is hereby corrected as shown below:

<u>Column 4,</u>
Line 58, "point" should read as -- points --
Line 59, "defines" should read as -- define --

Signed and Sealed this

Twenty-fourth Day of February, 2004

JON W. DUDAS
*Acting Director of the United States Patent and Trademark Office*